(12) United States Patent
Fujita et al.

(10) Patent No.: US 12,325,060 B2
(45) Date of Patent: Jun. 10, 2025

(54) METHOD FOR PRODUCING FRAME STRUCTURE

(71) Applicant: KOBE STEEL, LTD., Kobe (JP)

(72) Inventors: Yuki Fujita, Yamaguchi (JP); Taiki Yamakawa, Yamaguchi (JP); Takumi Nakahara, Yamaguchi (JP); Narikazu Hashimoto, Yamaguchi (JP); Yoshihaya Imamura, Tokyo (JP)

(73) Assignee: KABUSHIKI KAISHA KOBE SEIKO SHO (KOBE STEEL, LTD.), Kobe (JP)

( * ) Notice: Subject to any disclaimer, the term of this patent is extended or adjusted under 35 U.S.C. 154(b) by 0 days.

(21) Appl. No.: 18/697,895

(22) PCT Filed: Sep. 22, 2022

(86) PCT No.: PCT/JP2022/035534
§ 371 (c)(1),
(2) Date: Apr. 2, 2024

(87) PCT Pub. No.: WO2023/063053
PCT Pub. Date: Apr. 20, 2023

(65) Prior Publication Data
US 2025/0010357 A1    Jan. 9, 2025

(30) Foreign Application Priority Data

Oct. 15, 2021 (JP) .................. 2021-169696

(51) Int. Cl.
*B21D 53/88*  (2006.01)
*B23K 11/00*  (2006.01)
*B23K 37/003* (2025.01)

(52) U.S. Cl.
CPC .......... *B21D 53/88* (2013.01); *B23K 11/0046* (2013.01); *B23K 37/003* (2013.01)

(58) Field of Classification Search
CPC . B23K 37/003; B23K 11/0046; B62D 21/157
See application file for complete search history.

(56) References Cited

U.S. PATENT DOCUMENTS 2,298,249 A * 10/1942 Brown, Jr. ......... B23K 11/0046
                                                      219/81
2,298,250 A * 10/1942 Brown, Jr. ......... B23K 11/0046
                                                      219/107
(Continued)

FOREIGN PATENT DOCUMENTS

JP    H04313496 A  * 11/1992  ............. B23K 31/00
JP    2588698 Y2     1/1999
(Continued)

OTHER PUBLICATIONS

JPH04313496A machine translation (Year: 1992).*
International Search Report mailed on Dec. 13, 2022 in PCT/JP2022/035534 filed on Sep. 22, 2022, 2 pages.

*Primary Examiner* — Michael W Hotchkiss
(74) *Attorney, Agent, or Firm* — Oblon, McClelland, Maier & Neustadt, L.L.P.

(57) ABSTRACT

A method for producing a frame structure contains a hollow member having a curved and long shape, and a plurality of connecting members welded to the hollow member along a longitudinal direction of the hollow member. Each of the connecting members is welded to the hollow member, and a cooling medium is introduced into the inside of the hollow member through an end of the hollow member after the welding. The welding and the introducing are conducted repeatedly in the number of the connecting members.

18 Claims, 8 Drawing Sheets

(56) References Cited

U.S. PATENT DOCUMENTS

| | | | | |
|---|---|---|---|---|
| 4,387,845 A | * | 6/1983 | Mefferd | B23K 37/053 |
| | | | | 219/160 |
| 6,666,500 B2 | * | 12/2003 | Polzer | B62D 21/157 |
| | | | | 296/205 |
| 8,857,852 B2 | * | 10/2014 | Yamamoto | B62D 21/157 |
| | | | | 52/834 |
| 10,293,862 B1 | * | 5/2019 | Patel | B62D 21/15 |

FOREIGN PATENT DOCUMENTS

| | | |
|---|---|---|
| JP | 2001-239978 A | 9/2001 |
| JP | 2005-66668 A | 3/2005 |

* cited by examiner

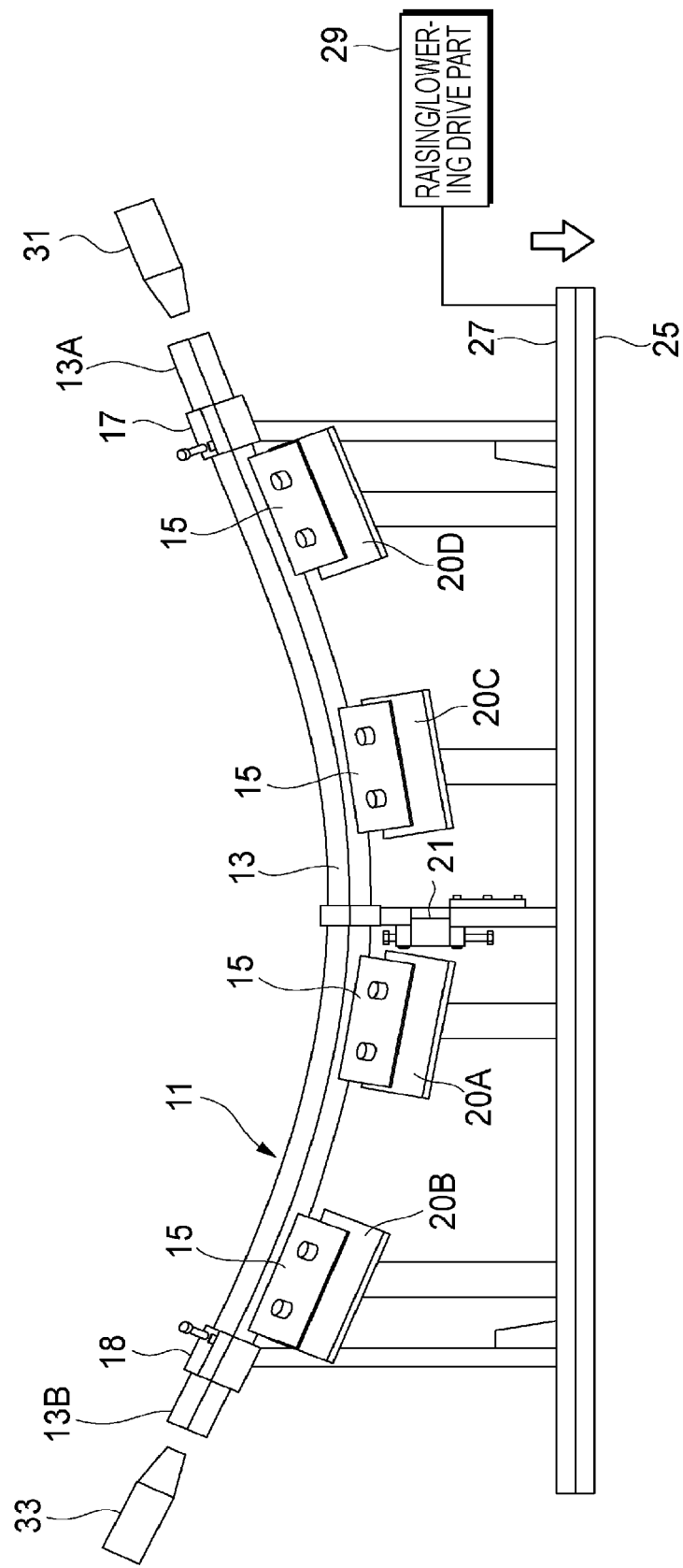

METHOD FOR PRODUCING FRAME STRUCTURE

TECHNICAL FIELD

The present invention relates to a method for producing a frame structure.

BACKGROUND ART

Frame structures for use in vehicles, various industrial machines, etc. are frequently produced by providing some of a frame member with connecting members, e.g., brackets, for connection to other members or to the main bodies of, for example, vehicles. Not only connecting members are provided to a linear portion of a frame member but also in the case of a frame member which has undergone bending, connecting members are sometimes provided to the bent portion or to the vicinity thereof. Since the connecting members are to be joined, with high accuracy, to an object to which the frame structure is to be assembled, it is necessary to attach the connecting members to the frame member so as to have a given degree of geometrical positional accuracy with respect to the members to be connected thereto.

As a means for attaching such connecting members, there is a method in which the connecting members are attached to a frame member with a mechanical joining means, e.g., bolts (Patent Document 1). In this method, the positions where the connecting members are to be attached can be regulated, for example, by forming attachment holes having, for example, an elongated shape, making it easy to regulate the accuracy of attachment portions for the connecting members.

The method, however, has drawbacks in that the method necessitates an increased number of steps including holing and that the connecting-member attachment portions include a larger number of components due to the use of bolts or the like, resulting in an increase in the overall weight of the frame structure.

As a means for overcoming these drawbacks, there are techniques in which connecting members are attached to a frame member by welding (Patent Documents 2 and 3). Since these techniques can join brackets to a frame member without causing an increase in the number of components, the frame structure is inhibited from having an increased weight.

CITATION LIST

Patent Literature

Patent Document 1: Japanese Utility Model Registration No. 2588698
Patent Document 2: JP2005-066668 A
Patent Document 3: JP2001-239978 A

SUMMARY OF INVENTION

Technical Problems

However, in the attachment by welding, the joining surfaces of the connecting members deform due to a thermal distortion during welding and it is hence difficult to ensure the geometrical positional accuracy with respect to members to be joined to the connecting members. In addition, for example, in the case of a frame member having a bent portion, bending is generally conducted using a press, a bender (a finishing machine for push bending, pull bending, or mandrel bending), or the like and it is necessary to perform shape correction for obtaining dimensional accuracy in the bending. This shape correction tends to result in a large deformation amount to cause the member to undergo spring back. It is hence difficult to make the frame member itself have an accuracy within a given range.

Especially in the case of welding a plurality of connecting members to a frame member having a bent portion, thermal distortions due to welding accumulate, making it difficult to produce a structure having a highly accurate shape close to a design shape.

An object of the present invention is to provide a method for producing a frame structure including a hollow member having a bent portion and a plurality of connecting members welded thereto, the method being capable of producing the frame structure with high accuracy while inhibiting a decrease in accuracy due to thermal distortion.

Solution to the Problems

The present invention includes the following configuration.

A method for producing a frame structure including a hollow member having a curved and long shape, and a plurality of connecting members welded to the hollow member along a longitudinal direction of the hollow member, the method including
  a welding step in which each of the connecting members is welded to the hollow member and
  a cooling step in which after the welding step, a cooling medium is introduced into the inside of the hollow member through an end of the hollow member,
  the welding step and the cooling step being conducted repeatedly in the number of the connecting members.

Advantageous Effect Of Invention

According to the present invention, a frame structure including a hollow member having a bent portion and a plurality of connecting members welded thereto can be produced with high accuracy while being inhibited from suffering a decrease in accuracy due to thermal distortion.

BRIEF DESCRIPTION OF DRAWINGS

FIG. 5B is a front view of the production device, the view showing the upper base plate in the state of having been lowered toward a lower base plate.

DESCRIPTION OF EMBODIMENTS

Embodiments of the present invention are described in detail below using the drawings for reference.

Here, a frame structure for use in the ladder frame, roof frame, or the like of a vehicle is explained as an example, but objects to which the frame structure is applicable and the shape of the frame structure are not limited to these.

Frame Structure

Figure 1:
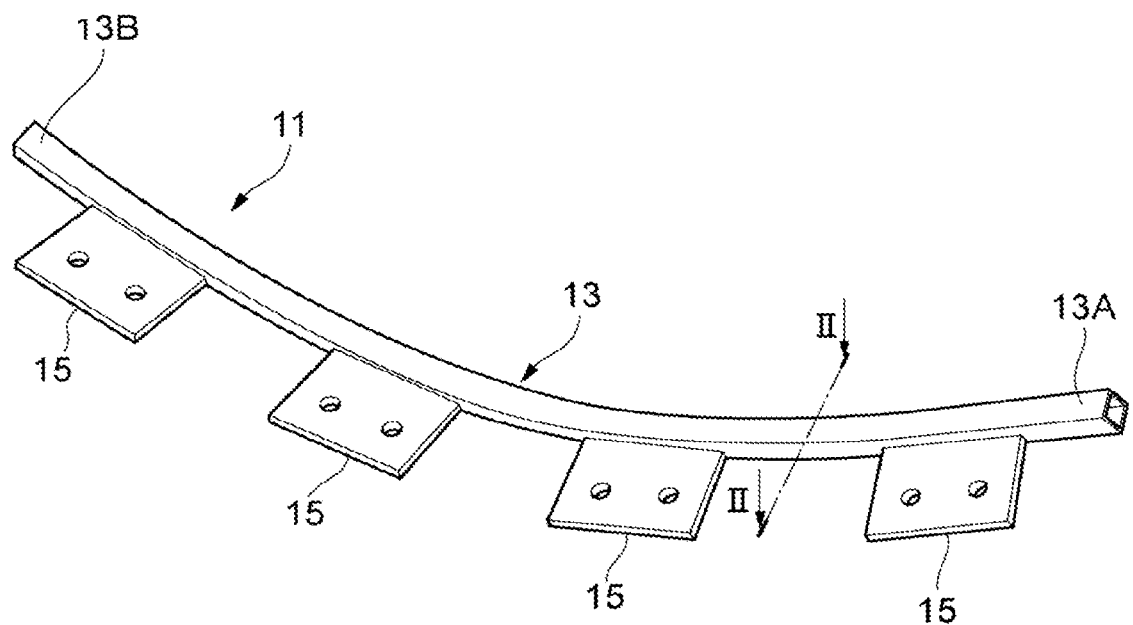
FIG. 1 is a slant view illustrating a frame structure.
Figure 2:
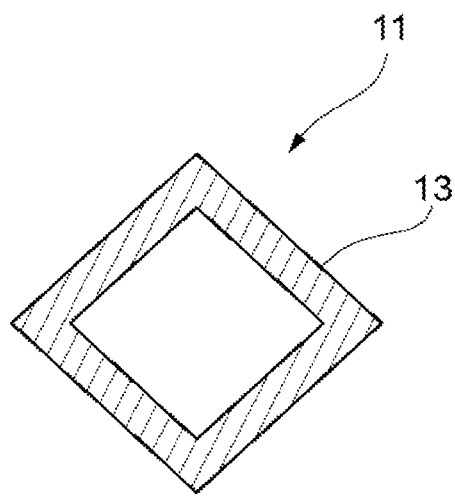
FIG. 2 is a cross-sectional view of the frame member cut along the line II-II of FIG. 1.

FIG. 1 is a slant view illustrating a frame structure 11. FIG. 2 is a cross-sectional view of the frame member cut along the line II-II of FIG. 1.

The frame structure 11 includes a long frame member 13 and brackets 15 as connecting members. The plurality of brackets 15 included in the frame structure 11 have been disposed so as to be separated from each other along the longitudinal direction of the frame member 13.

The frame member 13 is, for example, a hollow extruded member which has a quadrilateral cross-section perpendicular to the axial direction and which, as a whole, has a bow-like curved shape. In a cross-sectional view of the frame member 13, one of the diagonals extends in a direction which substantially coincides with the curvature direction of the frame member 13. Besides being such extruded member, the frame member 13 may be a round pipe or a polygonal pipe. The frame member 13 may have a shape having a projecting portion, such as a rib, outside. The frame member 13 may have a shape having a projecting portion inside. This frame member 13 is a bent member formed by press forming or by processing with any desired forming machine, e.g., a bender.

The frame member 13 is preferably an aluminum alloy from the standpoint of weight reduction, but may be a steel material having higher strength, such as mild steel or high-tensile-strength steel. As the aluminum alloy, use can be made of various aluminum alloys including heat-treated alloys, such as the 6000 series and the 7000 series, and non-heat-treated alloys, such as the 5000 series. The heat treatment type aluminum alloys are preferably ones which have undergone T1 or T5 thermal refining, and may be ones in which the vicinity of a bent portion has been locally softened.

The brackets 15 are integrally connected to a longitudinal-direction intermediate portion of the frame member 13. The brackets 15 each are a plate or have a shape formed by bending a plate, and one edge thereof is welded to the frame member 13. The brackets 15 are preferably made of a material of the same kind weldable to the frame member 13. For example, in cases when the frame member 13 is an aluminum alloy, the brackets 15 also are an aluminum alloy.

Device for Producing Frame Structure

Figure 3:
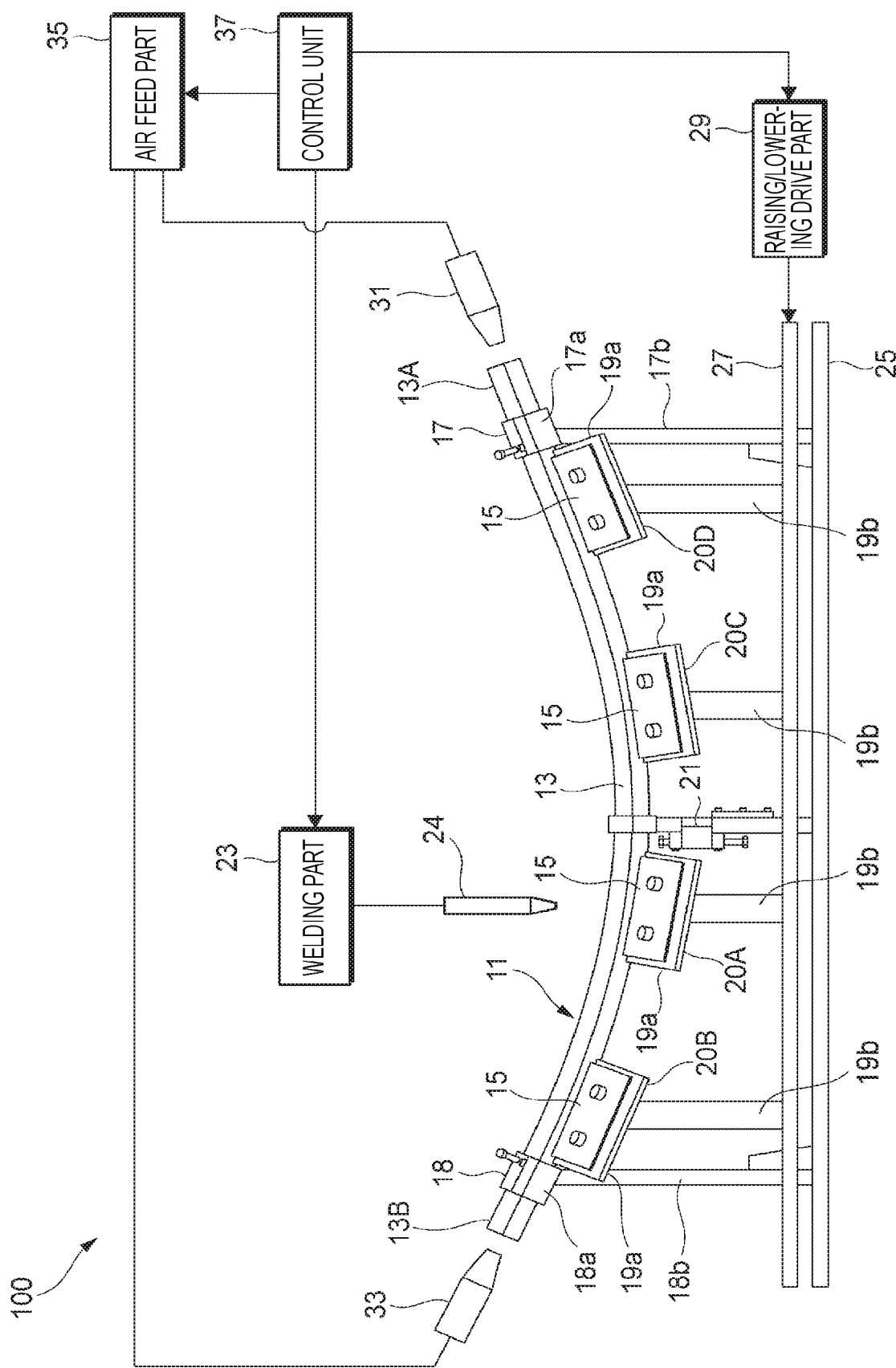
FIG. 3 is a diagram showing the entire configuration of a device for producing the frame structure.

FIG. 3 is a diagram showing the entire configuration of a device for producing the frame structure 11. In the following explanations, like members or portions are designated by like signs to omit or simplify the explanations.

The device (hereinafter referred to also as "production device") 100 for producing the frame structure 11 includes: a supporting part 17 which supports one end 13A of a frame member 13; a supporting part 18 which supports the other end 13B; a plurality of stands 20A, 20B, 20C, and 20D for disposing thereon brackets 15 opposite the frame member 13 somewhere along the longitudinal direction of the frame member 13; a frame-bending part 21; and a welding part 23.

The supporting part 17 includes a gripping part 17a for supporting the frame member 13 and a leg 17b having one end to which the gripping part 17a has been fixed. The supporting part 18 likewise includes a gripping part 18a and a leg 18b.

The stand 20A includes a fixing part 19a where a bracket 15 is placed and a leg 19b which supports the fixing part 19a, and the bracket 15 is positioned thereon with respect to the frame member 13. Like the stand 20A, the stands 20B, 20C, and 20D each include a fixing part 19a and a leg 19b supporting the fixing part 19a, and brackets 15 are positioned thereon with respect to the frame member 13.

The frame-bending part 21 has been disposed at a longitudinal-direction intermediate portion of the frame member 13 and imposes a bending load on the frame member 13 in the top-bottom direction of FIG. 3. As a result, the frame member 13 undergoes three-point bending based on the ends 13A and 13B and the intermediate portion of the frame member 13, and a top-bottom-direction elastic deformation is thereby given to the intermediate portion of the frame member 13.

The welding part 23 welds the brackets 15 to the frame member 13. The welding part 23 performs fusion welding, such as MIG or TIG, at the tip of a welding torch 24, and various welding conditions during the welding, such as welding speed, welding current, and welding voltage, can be regulated.

The production device 100 is equipped with cooling nozzles 31 and 33 and an air feed part 35. The cooling nozzle 31 is disposed in a position opposite the one end 13A of the frame member 13. The cooling nozzle 33 is disposed in a position opposite the other end 13B of the frame member 13. The air feed part 35 supplies air as a cooling medium to the cooling nozzle 31 or 33 to eject the air from the cooling nozzle 31 or 33. The air ejected from the cooling nozzle 31 is introduced into the inside of the frame member 13 from the one end 13A of the frame member 13. Likewise, the air ejected from the cooling nozzle 33 is introduced into the inside of the frame member 13 from the other end 13B of the frame member 13. The air to be sent into the frame member 13 from the cooling nozzle 31 or 33 may be made to contain an appropriate amount of an inert gas, such as nitrogen dioxide ($NO_2$), carbon dioxide ($CO_2$), or helium (He), according to need. Although a liquid, e.g., water, may be used as a cooling medium, use of air does not necessitate a post-treatment such as drying.

The production device 100 includes a lower base plate 25, an upper base plate 27, and a raising/lowering drive part 29. The upper base plate 27 is disposed on the upper side of the lower base plate 25 substantially in parallel therewith. The raising/lowering drive part 29 raises/lowers the upper base plate 27 while keeping the upper base plate 27 in parallel with the plate surface of the lower base plate 25. The legs 17b and 18b of the supporting parts 17 and 18 and the leg 21a of the frame-bending part 21 are fixed to the lower base plate 25. The legs 19b supporting the stands 20A, 20B, 20C, and 20D are fixed to the upper base plate 27, and the upper base plate 27 has openings (not shown) through which the legs 17b and 18b pierce respectively.

The production device 100 includes a control unit 37. The control unit 37 is connected to the welding part 23, the air feed part 35, and the raising/lowering drive part 29. The welding part 23, the air feed part 35, and the raising/lowering drive part 29 are controlled by the control unit 37.

Figure 4:
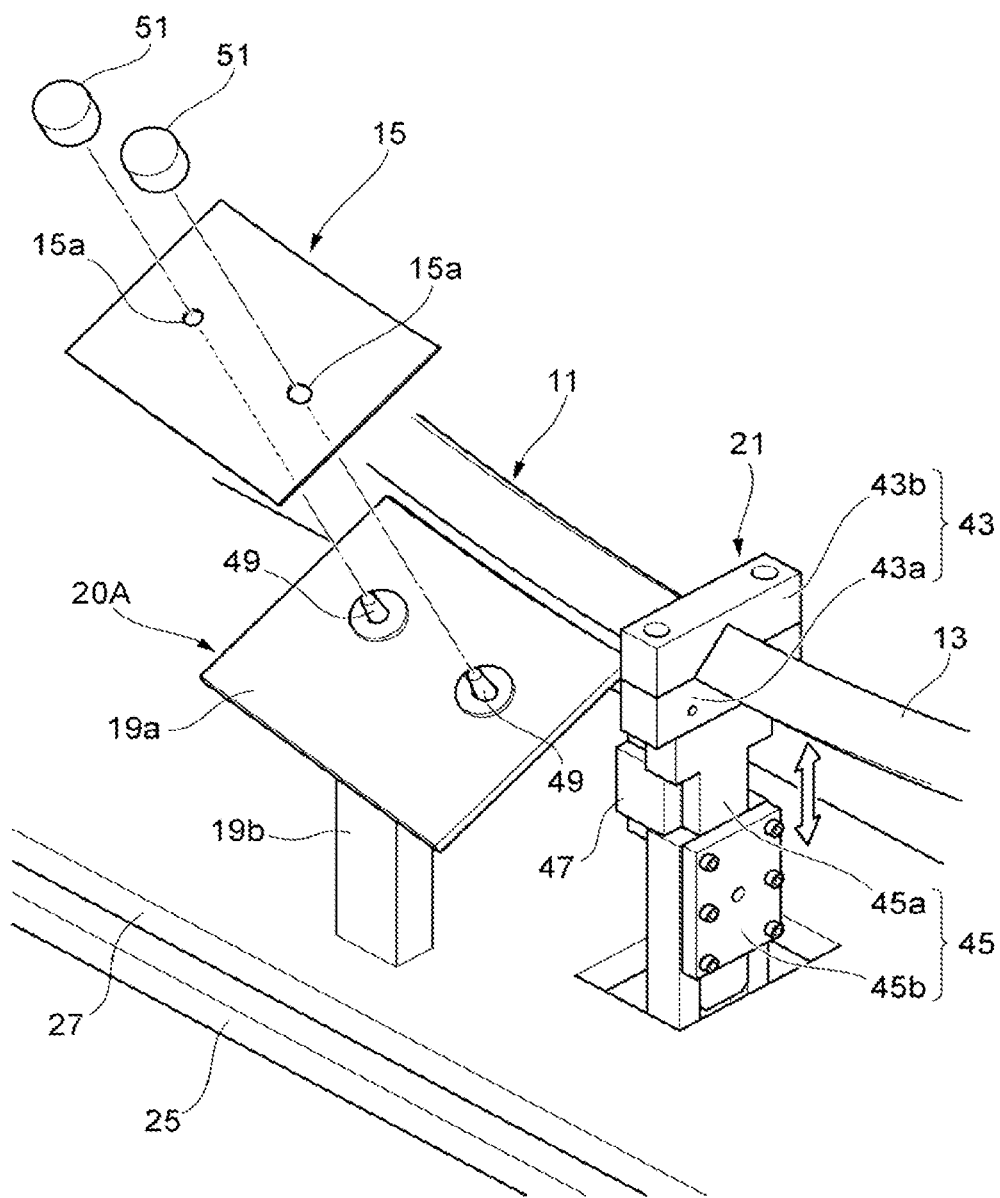
FIG. 4 is a view illustrating the configuration of a frame-bending part and showing how a bracket is disposed on a stand.

FIG. 4 is a view illustrating the configuration of the frame-bending part 21 and showing how a bracket 15 is disposed on the stand 20A.

The frame-bending part 21 includes: a gripping part 43 which grips the frame member 13; a supporting mechanism 45 which supports the gripping part 43 so that the gripping part 43 can ascend/descend; and a driving part 47 which raises/lowers the gripping part 43.

The gripping part 43 includes a lower supporting part 43a and an upper supporting part 43b, and the frame member 13 is sandwiched between the lower supporting part 43a and the upper supporting part 43b so that the frame member 13 is sandwiched in the gripping part 43 in the direction along one of the diagonals of the frame member 13. Then, the lower supporting part 43a and the upper supporting part 43b are joined to each other with joining members, e.g., bolts, thereby fixing the frame member 13 to the gripping part 43. Since the gripping part 43 holds the frame member 13 by thus sandwiching the frame member 13 along the diagonal direction, the faces of the frame member 13 can be prevented from being partly pressed when a bending load is imposed on the frame member 13. A local cross-sectional deformation can hence be prevented.

The supporting mechanism 45 includes a fixed part 45a fixed to a leg 21a and a sliding part 45b, and the gripping part 43 is fixed to the sliding part 45b. The driving part 47 raises/lowers the sliding part 45b to give a downward pulling force or an upward pushing force to the frame member 13 via the gripping part 43. Incidentally, the supporting parts 17 and 18, which support both ends of the frame member 13, include gripping parts 17a and 18a which each have the same gripping mechanism as the gripping part 43. The gripping parts 17a and 18a are fixing the frame member 13 by sandwiching the frame member 13 in the direction of the one diagonal thereof.

The leg 19b of the stand 20A has been disposed upright on the upper base plate 27, and a bracket 15 is placed on the upper surface of the fixing part 19a disposed at the upper end of the leg 19b. The stand 20A has a pair of pins 49 disposed so as to protrude from the upper surface of the fixing part 19a, and the bracket 15 has through holes 15a corresponding to the pins 49. The pair of pins 49 has been provided to the stand 20A so as to be located in a given base position with respect to positional relationships with the supporting parts 17 and 18.

The bracket 15 is placed on the upper surface of the fixing part 19a, with the pins 49 being inserted respectively into the through holes 15a. Clamps 51 are fitted to the pins 49 protruding through the through holes 15a. By the fitting of the clamps 51, the bracket 15 is positioned and fixed to the fixing part 19a.

The stands 20B, 20C, and 20d have the same configuration as the stand 20A, and explanations thereon are omitted.

Figure 5A:
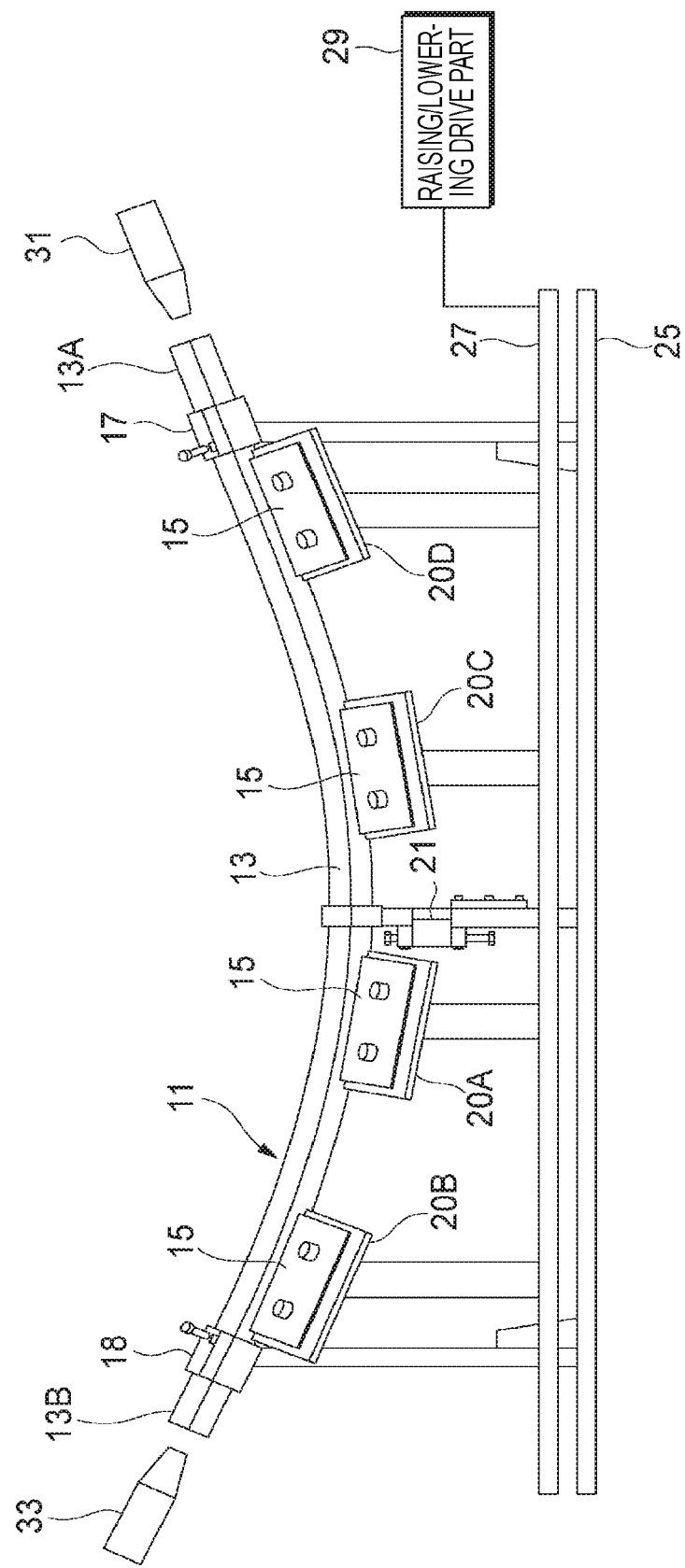
FIG. 5A is a front view of the production device, the view showing an initial state of an upper base plate.

FIG. 5A is a front view of the production device 100, the view showing an initial state of the upper base plate 27. FIG. 5B is a front view of the production device 100, the view showing the upper base plate 27 in the state of having been lowered toward the lower base plate 25.

As FIG. 5A shows, the raising/lowering drive part 29 raises/lowers the upper base plate 27 to separate the upper base plate 27 from the lower base plate 25. The base positions of the brackets 15 are regulated by raising the upper base plate 27 with the raising/lowering drive part 29. The brackets 15 are fixed to the stands 20A, 20B, 20C, and 20D in that state and are positioned with respect to the frame member 13. The welding part 23 is operated so that each bracket 15 which has been positioned with respect to the frame member 13 is welded to the frame member 13.

As FIG. 5B shows, as the raising/lowering drive part 29 lowers the upper base plate 27 toward the lower base plate 25, the brackets 15 are released from the fixing. That is, since the frame member 13 has been fixed to the supporting parts 17 and 18, when the stands 20A, 20B, 20C, and 20D descend integrally with the upper base plate 27, then the brackets 15 remain on the frame member 13 side and separate from the stands 20A, 20B, 20C, and 20D.

Welding of Brackets

In preparation for welding the brackets 15 to the frame member 13 by the production device 100 having the configuration described above, the upper base plate 27 is raised with the raising/lowering drive part 29, thereby disposing the brackets 15 fixed to the stands 20A, 20B, 20C, and 20D, in base positions. While the brackets 15 are kept in that state, the welding part 23 is operated to weld the brackets 15 to the frame member 13 with the welding torch 24. In this welding, by regulating the gap between the frame member 13 and each bracket 15, the quantity of welding heat can be efficiently controlled. Furthermore, the gap between the frame member 13 and the bracket 15 absorbs any displacement due to thermal distortion and a high degree of shape accuracy is obtained.

The entire length of each bracket 15 may be continuously welded to the frame member 13, but the entire length of the bracket 15 may be intermittently welded instead of being continuously welded. The intermittent welding results in a reduced welding length in one welding operation and can attain a reduction in heat input, making it possible to efficiently reduce the thermal distortion while ensuring sufficient weld strength. Short welding may be intermittently conducted so that the bracket 15 is finally welded over the entire length to the frame member 13.

In welding the brackets 15 to the frame member 13 by the production device 100, a bending load may be imposed on the frame member 13 with the frame-bending part 21. Specifically, the bracket 15 which has been fixed to the stand 20A, 20B, 20C, or 20D and disposed in a base position is temporarily fixed, for example, by partly welding the bracket 15 to the frame member 13. Thereafter, the upper base plate 27 is lowered toward the lower base plate 25 with the raising/lowering drive part 29 to remove the fixing of the bracket 15 which has been temporarily fixed. Furthermore, a bending load is imposed with the frame-bending part 21 on a longitudinal-direction intermediate portion of the frame member 13 to bring the frame member 13 into an elastically deformed state, and the bracket 15 is final-welded to the frame member 13 in that state. By thus performing final-welding while the frame member 13 to which a bracket 15 has been temporarily fixed is kept in the elastically deformed state, the thermal distortion due to the final-welding can be inhibited from remaining in the frame member 13 and the frame structure 11 can be made to have a shape close to a design shape.

Production Procedure

A procedure for producing the frame structure 11 by the production device 100 having the configuration described above is explained.

Figure 6A:
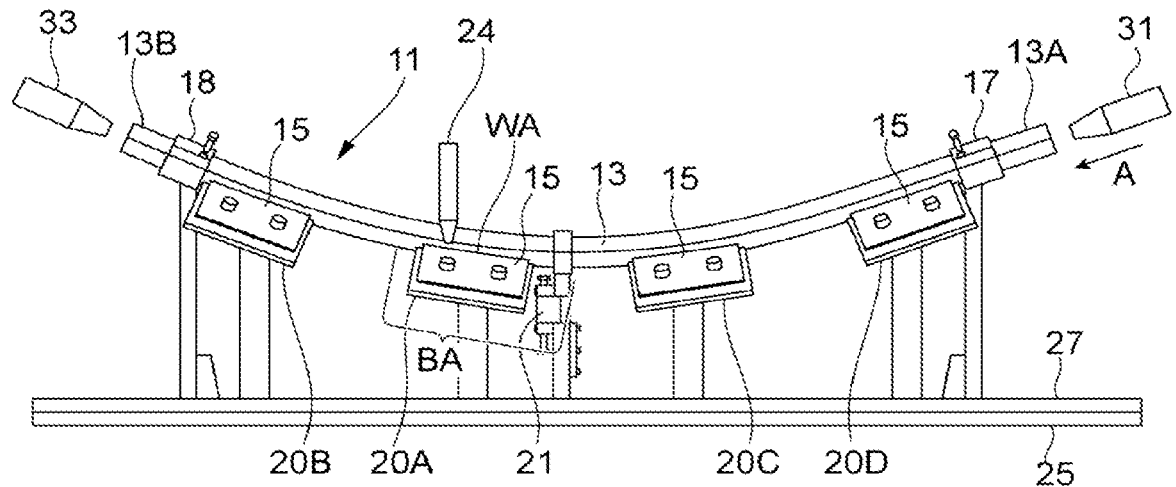
FIG. 6A is a front view of the production device, the view showing steps for producing the frame structure.
Figure 6B:
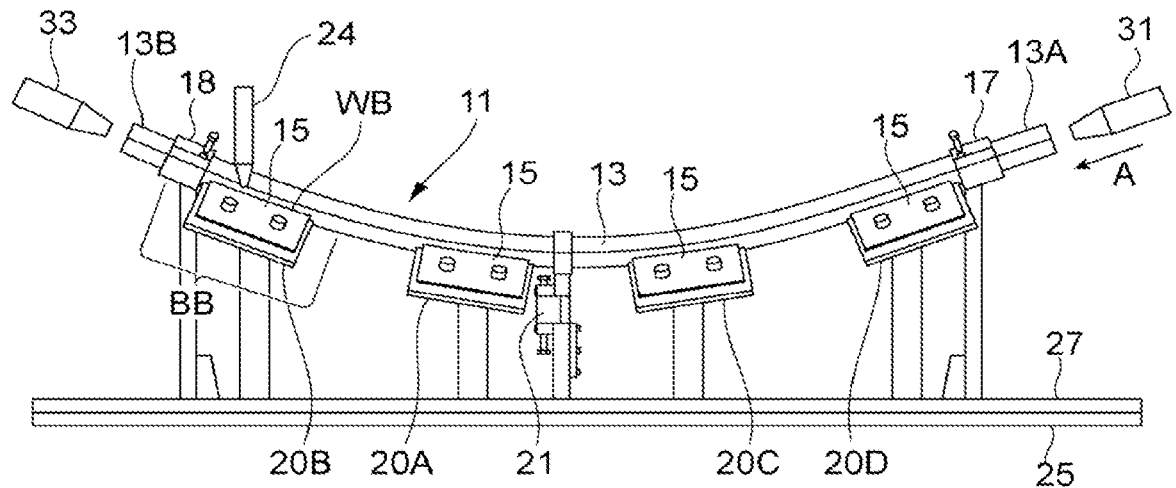
FIG. 6B is a front view of the production device, the view showing steps for producing the frame structure.
Figure 6C:
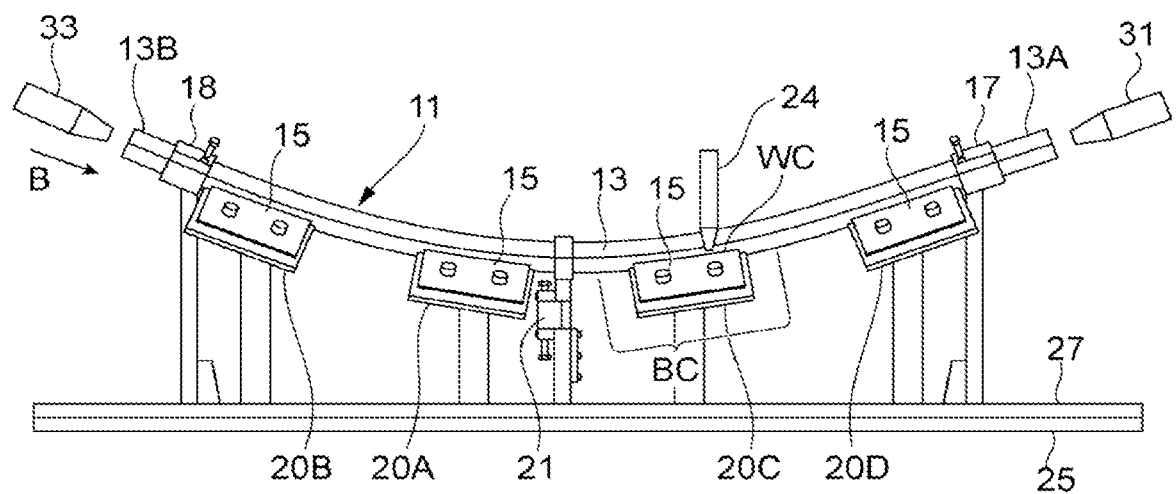
FIG. 6C is a front view of the production device, the view showing steps for producing the frame structure.
Figure 6D:
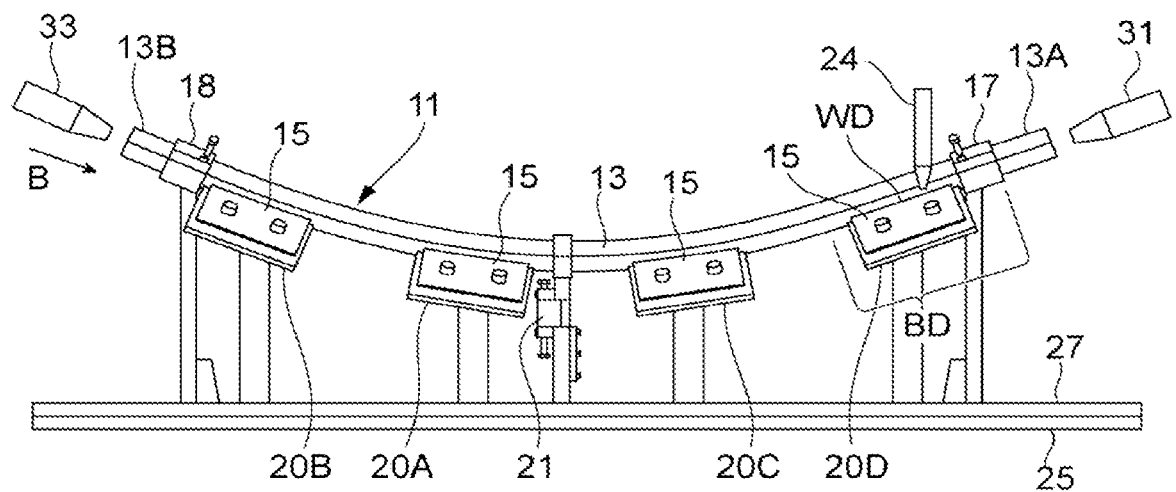
FIG. 6D is a front view of the production device, the view showing steps for producing the frame structure.
Figure 7A:
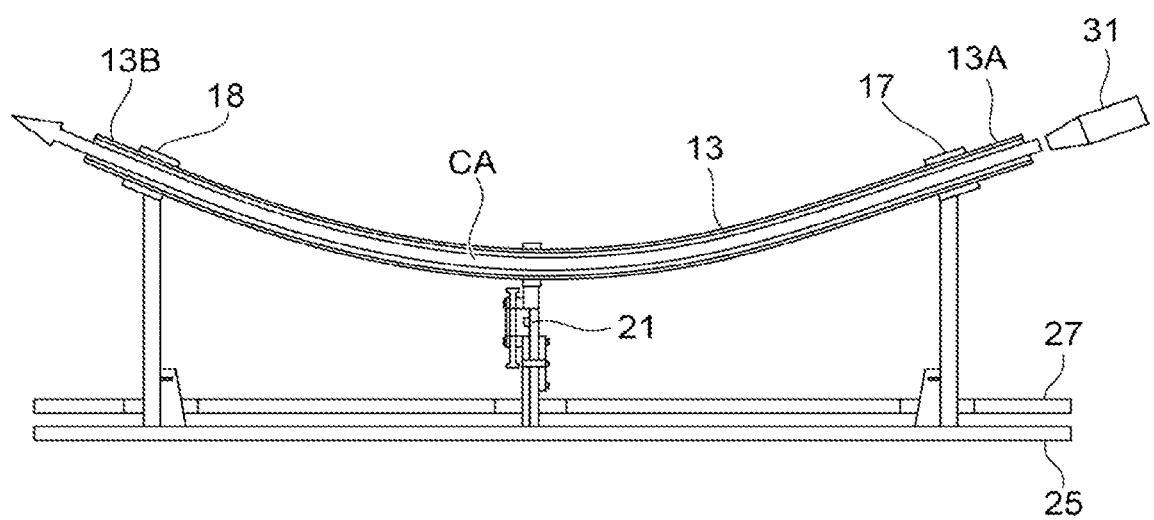
FIG. 7A is a diagrammatic sectional view illustrating the flow of air introduced into the frame member through an end thereof.
Figure 7B:
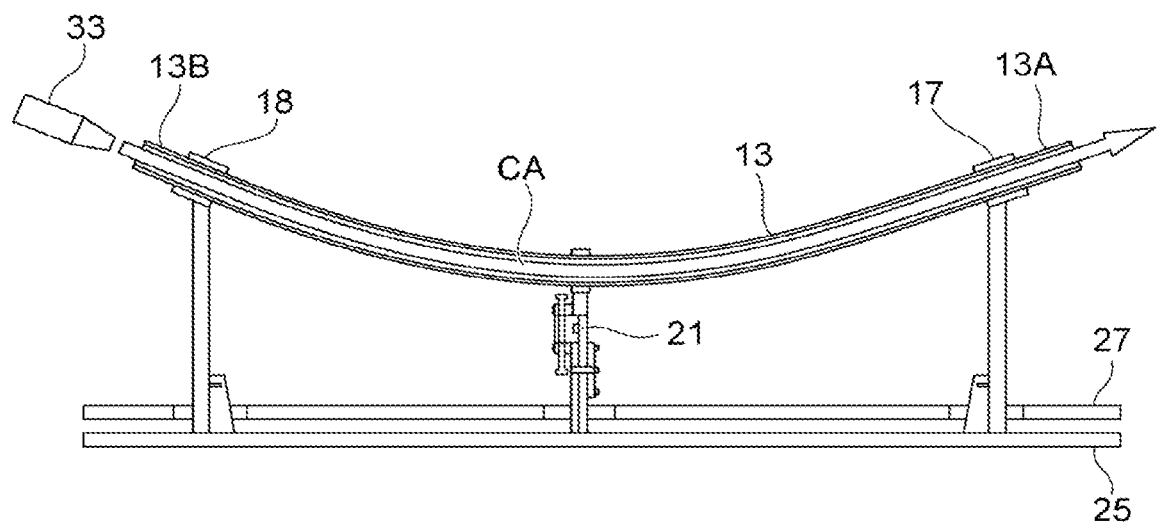
FIG. 7B is a diagrammatic sectional view illustrating the flow of air introduced into the frame member through an end thereof.

FIG. 6A to FIG. 6D are front views of the production device 100 which show steps for producing the frame structure 11, and FIG. 7A and FIG. 7B are diagrammatic sectional views illustrating flows of air CA introduced through the ends of the frame member 13. The example which is explained here is the case where brackets 15 supported on the stands 20A, 20B, 20C, and 20D are successively welded to a frame member 13.

(Joining of Bracket 15 on Stand 20A)

As FIG. 6A shows, the welding part 23 is operated to weld the bracket 15 supported on the stand 20A to the frame member 13 with the welding torch 24 (welding step).

Immediately after the welding of the bracket 15 on the stand 20A to the frame member 13, the air feed part 35 is operated to introduce air as a cooling medium into the inside of the frame member 13 (cooling step).

In this cooling, air is introduced into the inside of the frame member 13 so that the air touches a bent portion BA of the frame member 13 which lies at the weld WA of the bracket 15. Specifically, air is ejected from the cooling nozzle 31 disposed on the side where that one end 13A of the frame member 13 which is more separated from the weld WA of the bracket 15 lies, and the air is introduced toward the inside of the frame member 13 (in the direction of arrow A in FIG. 6A). As a result, as FIG. 7A shows, the air CA introduced through the one end 13A of the frame member 13 flows through the inside of the frame member 13 along the frame member 13 and flows out through the other end 13B of the frame member 13. The air CA flows to the other end 13B while touching the bent portion BA of the frame member 13 at the weld WA. Thus, the weld WA of the bracket 15 and a vicinal area including the weld WA are effectively cooled by the air CA. The weld WA of the bracket 15 and the weld of the frame member 13 and the periphery thereof in an area including the weld WA are cooled to 70° C. or less while the temperatures of the weld of the frame member 13 and the periphery thereof, which have been heated by the welding, are being measured. Examples of means for the temperature measurement include local temperature measurement with a contact type thermometer, temperature measurement with a non-contact thermometer, and wide-range temperature measurement with temperature sensors or by thermography.

(Joining of Bracket 15 on Stand 20B)

After the bracket 15 supported on the stand 20A has been welded to the frame member 13 and cooled, the welding part 23 is operated to weld the bracket 15 supported on the stand 20B to the frame member 13 with the welding torch 24 as shown in FIG. 6B (welding step).

Immediately after the welding of the bracket 15 on the stand 20B to the frame member 13, the air feed part 35 is operated to introduce air as a cooling medium into the inside of the frame member 13 (cooling step).

In this cooling, air is introduced into the inside of the frame member 13 so that the air touches a bent portion BB of the frame member 13 which lies at the weld WB of the bracket 15. Specifically, air is ejected from the cooling nozzle 31 disposed on the side where that one end 13A of the frame member 13 which is more separated from the weld WB of the bracket 15 lies, and the air is introduced toward the inside of the frame member 13 (in the direction of arrow A in FIG. 6B). In this case also, as FIG. 7A shows, the air CA introduced through the one end 13A of the frame member 13 flows through the inside of the frame member 13 along the frame member 13 and flows to the other end 13B while touching the bent portion BB of the frame member 13 at the weld WB. Thus, the weld WB of the bracket 15 and a vicinal area including the weld WB are effectively cooled by the air CA. The weld WB of the bracket 15 and the weld of the frame member 13 and the periphery thereof in an area including the weld WB are cooled to 70° C. or less while the temperatures of the weld of the frame member 13 and the periphery thereof, which have been heated by the welding, are being measured.

(Joining of Bracket 15 on Stand 20C)

After the bracket 15 supported on the stand 20B has been welded to the frame member 13 and cooled, the welding part 23 is operated to weld the bracket 15 supported on the stand 20C to the frame member 13 with the welding torch 24 as shown in FIG. 6C (welding step).

Immediately after the welding of the bracket 15 on the stand 20C to the frame member 13, the air feed part 35 is operated to introduce air as a cooling medium into the inside of the frame member 13 (cooling step).

In this cooling, air is introduced into the inside of the frame member 13 so that the air touches a bent portion BC of the frame member 13 which lies at the weld WC of the bracket 15. Specifically, air is ejected from the cooling nozzle 33 disposed on the side where that other end 13B of the frame member 13 which is more separated from the weld WC of the bracket 15 lies, and the air is introduced toward the inside of the frame member 13 (in the direction of arrow B in FIG. 6C). As a result, as FIG. 7B shows, the air CA introduced through the other end 13B of the frame member 13 flows through the inside of the frame member 13 along the frame member 13 and flows out through the one end 13A of the frame member 13. The air CA flows to the one end 13A while touching the bent portion BC of the frame member 13 at the weld WC. Thus, the weld WC of the bracket 15 and a vicinal area including the weld WC are effectively cooled by the air CA. The weld WC of the bracket 15 and the weld of the frame member 13 and the periphery thereof in an area including the weld WC are cooled to 70° C. or less while the temperatures of the weld of the frame member 13 and the periphery thereof, which have been heated by the welding, are being measured.

(Joining of Bracket 15 on Stand 20D)

After the bracket 15 supported on the stand 20C has been welded to the frame member 13 and cooled, the welding part 23 is operated to weld the bracket 15 supported on the stand 20D to the frame member 13 with the welding torch 24 as shown in FIG. 6D (welding step).

Immediately after the welding of the bracket 15 on the stand 20D to the frame member 13, the air feed part 35 is operated to introduce air as a cooling medium into the inside of the frame member 13 (cooling step).

In this cooling, air is introduced into the inside of the frame member 13 so that the air touches a bent portion BD of the frame member 13 which lies at the weld WD of the bracket 15. Specifically, air is ejected from the cooling nozzle 33 disposed on the side where the other end 13B of the frame member 13 which is more separated from the weld WD of the bracket 15 lies, and the air is introduced toward the inside of the frame member 13 (in the direction of arrow B in FIG. 6D). In this case also, as FIG. 7B shows, the air CA introduced through the other end 13B of the frame member 13 flows through the inside of the frame member 13 along the frame member 13 and flows to the one end 13A while touching the bent portion BD of the frame member 13 at the weld WD. Thus, the weld WD of the bracket 15 and a vicinal area including the weld WD are effectively cooled by the air CA. The weld WD of the bracket 15 and the weld of the frame member 13 and the periphery thereof in an area including the weld WD are cooled to 70° C. or less while the temperatures of the weld of the frame member 13 and the periphery thereof, which have been heated by the welding, are being measured.

In the manner described above, the welding of a bracket 15 to the frame member 13 and the cooling by introducing air CA into the inside of the frame member 13 are repeated. As a result, a frame structure 11 is produced in which a plurality of brackets 15 have been welded along the longitudinal direction of the frame member 13.

Incidentally, cooling during welding is generally conducted by directly cooling the weld, e.g., a weld bead, by causing a cooling medium, e.g., air, to touch the weld or bringing a cooling member, e.g., copper or brass, into contact with the weld. In this case, however, temperature control is sometimes difficult depending on how the cooling medium touches the weld, how the cooling member is brought into contact with the weld, etc.

In contrast, in this production method, the welding of a bracket 15 to the frame member 13 and the cooling by introducing air CA into the inside of the frame member 13 are repeated to produce a frame structure 11 in which a plurality of brackets 15 have been welded along the longitudinal direction of the frame member 13. In this manner, each time when a bracket 15 has been welded, air CA is caused to flow through the inside of the frame member 13 and the weld WA, WB, WC, or WD is thereby cooled to control the thermal distortion. Heat removal from the weld WA, WB, WC, or WD can hence be stably conducted. Thus, the accumulation of thermal distortions is inhibited and the amount of shape correction for correcting any deformation due to thermal distortion can be reduced, making it possible to produce a frame structure 11 having a shape close to a design shape. Furthermore, since the weld is cooled each time when a bracket 15 has been welded, the step of welding the next bracket 15 can be rapidly initiated. As a result, the time between welding passes can be shortened and the production efficiency can be improved.

Moreover, since, in the cooling step, air CA is introduced so as to touch the bent portion BA, BB, BC, or BD in the weld WA, WB, WC, or WD of the bracket 15, it is possible to effectively cool the weld WA, WB, WC, or WD of the bracket 15 and the vicinal area with the air CA.

In addition, by introducing the air CA through one end 13A or the other end 13B of the frame member 13, the air CA can be made to smoothly flow in one direction through the inside of the frame member 13. Hence, the efficiency of cooling is heightened and thermal distortions can be more accurately controlled.

The air CA is introduced through one of the ends 13A and 13B of the frame member 13 which is more separated from the weld WA, WB, WC, or WD of the bracket 15. Because of this, the turbulence of the introduced air CA is enhanced before the air CA reaches the weld WA, WB, WC, or WD. Hence, the coefficient of heat transfer with the air CA in the weld WA, WB, WC, or WD and in the vicinal area is heightened to improve the efficiency of cooling.

Furthermore, in the cooling step, by cooling each weld of the frame member 13 and the periphery thereof to 70° C. or lower, thermal distortions in the case of welding materials showing large thermal distortions can be more efficiently reduced. In particular, thermal distortions in MIG welding or the like, which is high in heat input, can be effectively reduced.

The sequence of welding the brackets 15 supported on the stands 20A, 20B, 20C, and 20D to the frame member 13 is not limited to that used in the example described above.

Here, a plurality of brackets 15 were welded to a frame member 13 by this production method to produce a frame structure 11 and this frame structure 11 was examined for influences of the welding heat.

As the frame member 13, use was made of an extruded material formed from a heat treatment type aluminum alloy which had undergone T1 thermal refining and which had a Vickers hardness of 60 HV and a tensile strength of 155 N/mm$^2$. A plurality of brackets 15 were welded to this frame member 13 and the resultant work was subjected to 3-hour tempering at 190° C. (low-temperature annealing) as T5 thermal refining. As a result, the Vickers hardness after the welding of the brackets 15 was about 60 HV (in positions at a distance of 6-7 mm from the welds) and remained substantially unchanged through the welding. After the frame structure had undergone T5 thermal refining by the tempering, the Vickers hardness was about 85 HV (in positions at a distance of 6-7 mm from the welds), showing that there was no heat-affected soft zone. In addition, it was ascertained that the frame structure 11 produced by this production method underwent no decrease in shape accuracy even when heated at temperatures used for the tempering.

It seems as shown above that this production method, in which immediately after the welding of each bracket 15 to the frame member 13, air CA was introduced into the inside of the frame member 13 to forcedly cool the weld from inside the frame member 13, enabled the heat-affected zones due to the welding to become slightly harder without softening.

The present invention is not limited to the embodiments described above. Combining configurations of the embodiments or modifying or applying any of the embodiments by a person skilled in the art on the basis of this description and a known technique is predicted from the present invention and is included in the claimed range.

For example, although brackets were used as an example of the connecting members in the explanations, the connecting members are not limited to brackets and may be structural members, e.g., other frames, or components, functional members, etc. to be joined to the frame member.

As described above, this description discloses the following matters.

(1) A method for producing a frame structure including a curved long hollow member and a plurality of connecting members welded thereto along a longitudinal direction thereof, the method including a welding step in which each connecting member is welded to the hollow member and a cooling step in which after the welding step, a cooling medium is introduced into the inside of the hollow member through an end thereof, the welding step and the cooling step being conducted repeatedly in the number of the connecting members.

In this frame structure production method, welding of a connecting member to the hollow member and cooling by introducing a cooling medium into the inside of the hollow member are repeated to produce a frame structure in which a plurality of connecting members have been welded along the longitudinal direction of the hollow member. Since the weld is cooled by introducing a cooling medium into the inside of the hollow member to control the thermal distortion each time when a connecting member has been welded, heat can be stably removed from the weld. Thus, the accumulation of thermal distortions can be reduced and the amount of shape correction for correcting any deformation due to thermal distortion can be reduced, making it possible to produce a frame structure having a shape close to a design shape. Furthermore, since the weld is cooled each time when a connecting member has been welded, the step of welding the next connecting member can be rapidly initiated. As a result, the time between welding passes can be shortened and the production efficiency can be improved.

(2) The method for producing a frame structure according to (1) wherein in the cooling step, the cooling medium is introduced so that the cooling medium touches a bent portion at a weld of the connecting member.

In this method for frame structure production, since the cooling medium is introduced so that the cooling medium touches a bent portion at a weld of the connecting member, it is possible to effectively cool the weld of the connecting member and an area at least including the weld, with the cooling medium.

(3) The method for producing a frame structure according to (1) or (2) wherein in the cooling step, the cooling medium is introduced through one end or the other end of the hollow member.

In this method for frame structure production, since the cooling medium is introduced through one end or the other end of the hollow member, the cooling medium can be made to smoothly flow in one direction through the inside of the hollow member, making it possible to heighten the efficiency of cooling and more accurately control the thermal distortions.

(4) The method for producing a frame structure according to (3) wherein in the cooling step, the cooling medium is introduced through that end of the hollow member which is more separated from a weld of the connecting member.

In this method for frame structure production, since the cooling medium is introduced through that end of the hollow member which is more separated from a weld of the connecting member, the flow of the introduced cooling medium changes from a laminar flow to a turbulent flow before the cooling medium reaches the weld. As a result, the coefficient of heat transfer with the cooling medium in the weld and in the area at least including the weld is heightened to improve the efficiency of cooling.

(5) The method for producing a frame structure according to any one of (1) to (4) wherein in the cooling step, a weld of the connecting member, a weld of the hollow member lying in an area at least including the weld of the connecting member, and a periphery of the weld of the hollow member are cooled to 70° C. or lower.

In this method for frame structure production, since the weld of the connecting member, the weld of the connecting member, and the periphery of the weld of the hollow member are cooled to 70° C. or lower, it is possible to more efficiently reduce thermal distortions in the case of welding materials that show large thermal distortions. In particular, thermal distortions in MIG welding or the like, which is high in heat input, can be effectively reduced.

In this method for frame structure production, since air is used as the cooling medium, not only the cooling can be inexpensive but also, as compared with the case of using a cooling medium such as a liquid, this method does not necessitate a post-treatment such as drying and the production efficiency increases.

(7) The method for producing a frame structure according to any one of (1) to (6) wherein in the welding step, each of the connecting members is temporarily fixed to somewhere along the longitudinal direction of the hollow member, and then each of the connecting member is final-welded to the hollow member while the hollow member is kept in an elastically deformed state by imposing a bending load on an intermediate portion along the longitudinal-direction of the hollow member.

In this method for frame structure production, since final-welding is conducted while the hollow member to which a connecting member has been temporarily fixed is kept in an elastically deformed state, the thermal distortion due to the final-welding can be inhibited from remaining in the hollow member and the frame structure can be made to have a shape closer to a design shape.

This application is based on a Japanese patent application filed on Oct. 15, 2021 (Application No. 2021-169696), the contents thereof being incorporated herein by reference.

REFERENCE SIGNS LIST

11: Frame structure
13: Frame member (hollow member)
13A, 13B: End
15: Bracket (connecting member)
BA, BB, BC, BD: Bent portion
CA: Air (cooling medium)
WA, WB, WC, WD: Weld

The invention claimed is:

1. A method for producing a frame structure having a hollow member that is curved along a length of the hollow member and has a long shape, the method comprising: welding a plurality of connecting members to the hollow member along a longitudinal direction of the hollow member; introducing, after the welding, a cooling medium into an inside of the hollow member through an end of the hollow member; and repeatedly conducting the welding and the introducing for the plurality of connecting members, wherein the cooling medium is introduced so that a weld of the connecting member, a weld of the hollow member lying in an area at least including the weld of the connecting member, and a periphery of the weld of the hollow member are cooled to 70° C. or lower.

2. A method for producing a frame structure having a hollow member that is curved along a length of the hollow member and has a long shape, the method comprising: welding a plurality of connecting members to the hollow member along a longitudinal direction of the hollow member; introducing, after the welding, a cooling medium into an inside of the hollow member through an end of the hollow member; and repeatedly conducting the welding and the introducing for the plurality of connecting members, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

3. A method for producing a frame structure having a hollow member that is curved along a length of the hollow member and has a long shape, the method comprising: welding a plurality of connecting members to the hollow member along a longitudinal direction of the hollow member; introducing, after the welding, a cooling medium into an inside of the hollow member through an end of the hollow member and repeatedly conducting the welding and the introducing for the plurality of connecting members, wherein the introducing of the cooling medium inside the hollow member is performed after the welding of each connecting member, and the cooling medium is not introduced inside the hollow member during the welding of each connecting member, and wherein the cooling medium is introduced so that the cooling medium touches a bent portion at a weld of the connecting member.

4. The method for producing a frame structure according to claim 3, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

5. The method for producing a frame structure according to claim 3, wherein air is introduced as the cooling medium into the inside of the hollow member.

6. The method for producing a frame structure according to claim 5, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

7. The method for producing a frame structure according to claim 3, wherein the cooling medium is introduced through one end or the other end of the hollow member.

8. The method for producing a frame structure according to claim 7, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

9. The method for producing a frame structure according to claim 7, wherein the cooling medium is introduced through that end of the hollow member which is more separated from a weld of the connecting member.

10. The method for producing a frame structure according to claim 3, wherein the cooling medium is introduced through one end or the other end of the hollow member.

11. The method for producing a frame structure according to claim 9, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

12. The method for producing a frame structure according to claim 11, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

13. The method for producing a frame structure according to claim 11, wherein the cooling medium is introduced through that end of the hollow member which is more separated from the weld of the connecting member.

14. The method for producing a frame structure according to claim 13, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

15. The method for producing a frame structure according to claim 3, wherein the cooling medium is introduced so that a weld of the connecting member, a weld of the hollow member lying in an area at least including the weld of the connecting member, and a periphery of the weld of the hollow member are cooled to 70° C. or lower.

16. The method for producing a frame structure according to claim 15, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

17. The method for producing a frame structure according to claim 15, wherein air is introduced as the cooling medium into the inside of the hollow member.

18. The method for producing a frame structure according to claim 17, wherein in the welding, each of the connecting members is temporarily fixed to somewhere along the longitudinal direction of the hollow member, and then each of the connecting members is final-welded to the hollow member while the hollow member is kept in an elastically deformed state by imposing a bending load on an intermediate portion along the longitudinal direction of the hollow member.

* * * * *